United States Patent
Wang

(10) Patent No.: US 10,212,480 B2
(45) Date of Patent: Feb. 19, 2019

(54) METHOD, APPARATUS AND COMPUTER PROGRAM PRODUCT FOR SWITCHING TELEVISION CHANNELS

(71) Applicant: HTC Corporation, Taoyuan County (TW)

(72) Inventor: John C. Wang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/066,698

(22) Filed: Oct. 30, 2013

(65) Prior Publication Data

US 2014/0130100 A1    May 8, 2014

Related U.S. Application Data

(60) Provisional application No. 61/721,513, filed on Nov. 2, 2012.

(51) Int. Cl.
*H04N 21/482* (2011.01)
*H04N 21/41* (2011.01)
(Continued)

(52) U.S. Cl.
CPC ....... *H04N 21/482* (2013.01); *H04N 21/4126* (2013.01); *H04N 21/42224* (2013.01);
(Continued)

(58) Field of Classification Search
CPC ............. H04N 21/4821; H04N 21/482; H04N 21/4823; G06F 3/017; G06F 3/0488;
(Continued)

(56) References Cited

U.S. PATENT DOCUMENTS

| 5,621,456 A * | 4/1997 | Florin et al. ............... 725/43 |
| 2003/0018973 A1* | 1/2003 | Thompson ............ H04H 60/40 725/47 |

(Continued)

FOREIGN PATENT DOCUMENTS

| CN | 101355664 | 1/2009 |
| CN | 101557845 | 10/2009 |

(Continued)

OTHER PUBLICATIONS

"Office Action of Taiwan Counterpart Application," dated Aug. 24, 2015, p. 1-p. 11.

(Continued)

*Primary Examiner* — Brian T Pendleton
*Assistant Examiner* — Alan H Luong
(74) *Attorney, Agent, or Firm* — JCIPRNET

(57) ABSTRACT

A method, an apparatus, and a computer program product for switching television channels, adapted to an electronic apparatus having a touch screen for controlling a television system to switch the television channels, are provided. A control panel including a first and a second switching region is displayed on the touch screen. The first switching region corresponds to a plurality of first television channels provided by the television system, and the second switching region corresponds to a channel list which includes a plurality of second television channels selected from the first television channels. Next, a touch operation performed on the control panel is detected by using the touch screen. When the touch operation is within the first switching region, the first television channels are switched according to the touch operation. When the touch operation is within the second switching region, the second television channels are switched according to the touch operation.

15 Claims, 7 Drawing Sheets

(51) Int. Cl.
  *H04N 21/422* (2011.01)
  *H04N 21/431* (2011.01)
  *H04N 21/442* (2011.01)
  *H04N 21/84* (2011.01)

(52) U.S. Cl.
  CPC ... *H04N 21/4312* (2013.01); *H04N 21/44222* (2013.01); *H04N 21/84* (2013.01)

(58) Field of Classification Search
  CPC . G06F 2203/04803; G06F 2203/04808; G06F 3/041; G06F 3/0416; G06F 3/04883; G06F 3/0485
  USPC .......................................... 725/52; 348/731
  See application file for complete search history.

(56) References Cited

U.S. PATENT DOCUMENTS

| | | | | |
|---|---|---|---|---|
| 2004/0226042 | A1* | 11/2004 | Ellis | H04N 5/44543 725/43 |
| 2005/0010948 | A1* | 1/2005 | Kim | H04N 5/44543 725/38 |
| 2008/0168403 | A1* | 7/2008 | Westerman et al. | 715/863 |
| 2009/0109183 | A1 | 4/2009 | Carvajal et al. | |
| 2010/0103125 | A1* | 4/2010 | Kim | G06F 3/0482 345/173 |
| 2010/0269136 | A1* | 10/2010 | Huang | G06F 3/0488 725/38 |
| 2010/0309123 | A1* | 12/2010 | Sawai | G06F 3/0346 345/157 |
| 2012/0117584 | A1* | 5/2012 | Gordon | 725/19 |

FOREIGN PATENT DOCUMENTS

| | | |
|---|---|---|
| DE | 102007042068 | 9/2008 |
| EP | 2416563 | 2/2012 |
| TW | 201039638 | 11/2010 |
| TW | 201127038 | 8/2011 |
| TW | 201206168 | 2/2012 |
| TW | 201216090 | 4/2012 |

OTHER PUBLICATIONS

"Office Action of China Counterpart Application", dated Jul. 1, 2016, p. 1-p. 8.
"Office Action of Germany Counterpart Application," dated Dec. 6, 2017, p. 1-p. 6.

* cited by examiner

METHOD, APPARATUS AND COMPUTER PROGRAM PRODUCT FOR SWITCHING TELEVISION CHANNELS

CROSS-REFERENCE TO RELATED APPLICATION

This application claims the priority benefits of U.S. provisional application Ser. No. 61/721,513, filed on Nov. 2, 2012. The entirety of the above-mentioned patent application is hereby incorporated by reference herein and made a part of this specification.

BACKGROUND

Technical Field

The invention relates to a method, an apparatus and a computer program product for controlling a television. Particularly, the invention relates to a method, an apparatus and a computer program product for switching television channels.

Related Art

To accommodate today's busy lifestyles, various mobile apparatuses with portability and compact size have been developed. Taking a personal digital assistant (PDA), a PDA phone or a smart phone as an example, it not only comes with a variety of functions as provided in a conventional communication device, but also offers convenience to a user through the installation of applications (APP).

For example, a plurality of applications used for controlling a television have been developed. Such applications integrate a conventional television remote control into a mobile apparatus, where a simulated operating interface of the television remote control is displayed on the mobile apparatus so that the user can perform operations on the operating interface to control the television to execute the corresponding functions.

However, these applications only allow the user to switch the television channels forward or backward in a regular channel sequence. Although such channel switching method is simple and intuitive, when the television channel to be tuned is far away from the currently watched television channel in the channel sequence, the user cannot rapidly switch to the desired television channel. On the other hand, although some existing techniques provide the user to set a personal channel list according to user preferences, such channel list still relies on the user's manual settings, which cannot make an effective use of the advantages supported by the mobile apparatus such as gesture operation, programmability and internet accessibility.

SUMMARY

The invention is directed to a method, an apparatus and a computer program product for switching television channels, by which a user is capable of rapidly switching the television channels by using a mobile apparatus.

The invention provides a method for switching television channels, adapted to a mobile apparatus having a touch screen for controlling a television system to switch television channels displayed thereby, includes the following steps. First, a control panel including a first switching region and a second switching region is displayed on the touch screen. The first switching region corresponds to a plurality of first television channels provided by the television system, and the second switching region corresponds to a channel list, where the channel list includes a plurality of second television channels selected from the first television channels. Next, a touch operation performed on the control panel is detected by using the touch screen. When the touch operation is within the first switching region, the television system is controlled to switch the first television channels according to the touch operation. When the touch operation is within the second switching region, the television system is controlled to switch the second television channels according to the touch operation.

In an embodiment of the invention, the first switching region includes a first key and a second key, and the step of controlling the television system to switch the first television channel according to the touch operation includes the following steps. When the touch operation is performed on the first key, the television system is controlled to switch to a previous first television channel; when the touch operation is performed on the second key, the television system is controlled to switch to a next first television channel.

In an embodiment of the invention, the second switching region includes a third key and a fourth key, and the step of controlling the television system to switch the second television channel according to the touch operation includes the following steps. When the touch operation is performed on the third key, the television system is controlled to switch to a previous second television channel; when the touch operation is performed on the fourth key, the television system is controlled to switch to a next second television channel.

In an embodiment of the invention, the step of controlling the television system to switch the first television channels according to the touch operation includes controlling the television system to switch to a previous or a next first television channel according to a sliding direction of the touch operation.

In an embodiment of the invention, the step of controlling the television system to switch the second television channels according to the touch operation includes controlling the television system to switch to a previous or a next second television channel according to a sliding direction of the touch operation.

In an embodiment of the invention, the step of displaying the control panel including the first switching region and the second switching region on the touch screen includes displaying the channel list in the second switching region, where the channel list includes a plurality of options corresponding to the second television channels, and each of the options includes one or a combination of a name, an icon, program information and a program snapshot of the corresponding second television channel.

In an embodiment of the invention, after the step of controlling the television system to switch the first television channels according to the touch operation, the method further includes accumulating a staying time of the television system at one of the first television channel after the television system switches to the corresponding first television channel, and determining whether the staying time exceeds a time threshold. When the staying time exceeds the time threshold, the first television channel is added to the channel list.

In an embodiment of the invention, when it is determined that the staying time exceeds the time threshold, the method further includes accumulating a valid viewing frequency that the television system switches to the first television channel within a time unit given that the staying time at the first television channel exceeds the time threshold, and determining whether the valid viewing frequency exceeds a frequency threshold. When the valid viewing frequency exceeds the frequency threshold, the first television channel is added to the channel list.

In an embodiment of the invention, after the step of adding the first television channel to the channel list, the method further includes obtaining related information of a first television program broadcast on the first television channel at the moment when the first television channel is added to the channel list. According to the related information, when the first television program ends, the added first television channel and the added first television program are removed from the channel list.

In an embodiment of the invention, the first switching region and the second switching region are the same, and the step of controlling the television system to switch the first television channels and the second television channels according to the touch operation includes as follows. When the touch operation is a single-finger gesture operation, the television system is controlled to switch the first television channels according to the single-finger gesture operation; when the touch operation is a two-finger gesture operation, the television system is controlled to switch the second television channels according to the two-finger gesture operation.

The invention provides an apparatus for switching television channels including a touch screen, a storage unit, and one or a plurality of processing units. The storage unit is configured to record a plurality of modules. The processing unit, coupled to the touch screen and the storage unit, is configured to access and execute the modules stored in the storage unit. The modules include a display module, a detecting module, a switching module and a management module. The display module is configured to display a control panel including a first switching region and a second switching region on the touch screen. The first switching region corresponds to a plurality of first television channels provided by the television system, and the second switching region corresponds to a channel list, where the channel list includes a plurality of second television channels selected from the first television channels. The detecting module detects a touch operation performed on the control panel by using the touch screen. When the detecting module detects that the touch operation is within the first switching region, the switching module controls the television system to switch the first television channels according to the touch operation. When the detecting module detects that the touch operation is within the second switching region, the switching module controls the television system to switch the second television channels according to the touch operation.

In an embodiment of the invention, the first switching region includes a first key and a second key. When the detecting module detects that the touch operation is performed on the first key, the switching module controls the television system to switch to a previous first television channel; when the detecting module detects that the touch operation is performed on the second key, the switching module controls the television system to switch to a next first television channel.

In an embodiment of the invention, the second switching region includes a third key and a fourth key. When the detecting module detects that the touch operation is performed on the third key, the switching module controls the television system to switch to a previous second television channel; when the detecting module detects that the touch operation is performed on the fourth key, the switching module controls the television system to switch to a next second television channel.

In an embodiment of the invention, the switching module controls the television system to switch to a previous or a next first television channel according to a sliding direction of the touch operation detected by the detecting module.

In an embodiment of the invention, the switching module controls the television system to switch to a previous or a next second television channel according to a sliding direction of the touch operation detected by the detecting module.

In an embodiment of the invention, the display module displays the channel list in the second switching region, where the channel list includes a plurality of options corresponding to the second television channels, and each of the options includes one or a combination of a name, an icon, program information and a program snapshot of the corresponding second television channel.

In an embodiment of the invention, the modules further include a management module, which is configured to accumulate a staying time of the television system at one of the first television channels after the television system switches to the corresponding first television channel, and determine whether the staying time exceeds a time threshold. When the staying time exceeds the time threshold, the management module adds the corresponding first television channel to the channel list.

In an embodiment of the invention, the management module accumulates a valid viewing frequency that the television system switches to the first television channel within a time unit given that the staying time on the first television channel exceeds the time threshold, and determines whether the valid watching frequency exceeds a frequency threshold. When the valid viewing frequency exceeds the frequency threshold, the management module adds the first television channel to the channel list.

In an embodiment of the invention, the modules further include an information module, which is configured to obtain related information of a first television program broadcast on the first television channel at the moment when the first television channel is added to the channel list. According to the related information, when the first television program ends, the management module removes the added first television channel and the added first television program from the channel list.

In an embodiment of the invention, the first switching region and the second switching region are the same. When the detecting module detects that the touch operation is a single-finger gesture operation, the switching module controls the television system to switch the first television channels according to the single-finger gesture operation; when the detecting module detects that the touch operation is a two-finger gesture operation, the switching module controls the television system to switch the second television channels according to the two-finger gesture operation.

The invention provides a computer program product, which is adapted to be loaded to an electronic apparatus to execute the following steps. A control panel including a first switching region and a second switching region is displayed on a touch screen. The first switching region corresponds to a plurality of first television channels provided by a television system, and the second switching region corresponds to a channel list, where the channel list includes a plurality of second television channels selected from the first television channels. A touch operation performed on the control panel is detected by using the touch screen. When the touch operation is within the first switching region, the television system is controlled to switch the first television channels according to the touch operation. When the touch operation is within the second switching region, the television system is controlled to switch the second television channels according to the touch operation.

Based on the above descriptions, in the method, the apparatus and the computer program product for switching television channels, by displaying the control panel including two switching regions on the touch screen, the user can switch the television channels in a conventional way, or can rapidly switch the selected television channels in the channel list. Thereby, the user can rapidly switch to the desired television channels, so as to enhance the operating convenience of the mobile apparatus.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
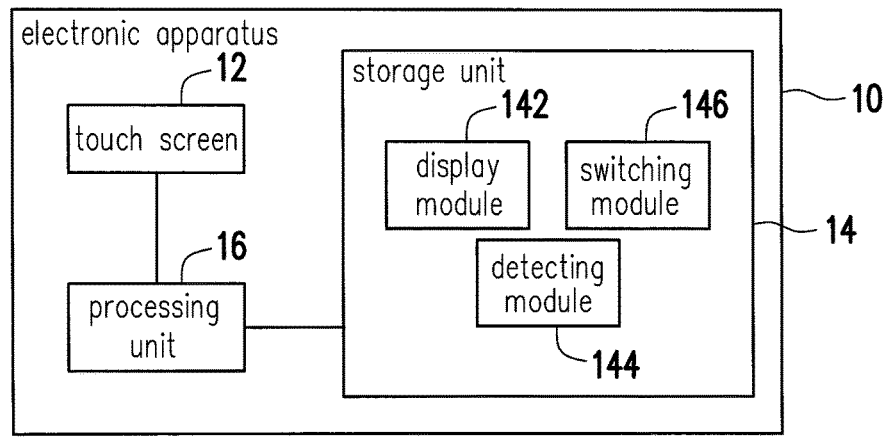
FIG. 1 is a block schematic diagram of an apparatus for switching television (TV) channels according to an embodiment of the invention.

FIG. 1 is a block schematic diagram of an apparatus for switching television (TV) channels according to an embodiment of the invention. Referring to FIG. 1, the electronic apparatus 10 of the present embodiment is, for example, a mobile phone, a smart phone, a personal digital assistant (PDA), a PDA phone, a notebook or a tabular computer. The electronic apparatus 10 includes a touch screen 12, a storage unit 14 and one or a plurality of processing units 16. The functions of aforementioned components will be respectively described in more detail hereinafter.

The touch screen 12, fabricated by integrating resistive, capacitive or other types of touch sensing devices with a liquid crystal display, is configured to detect touch operations performed by a user while displaying frames of the electronic apparatus 10.

The storage unit 14 is, for example, a stationary or mobile random access memory (RAM), a read-only memory (ROM), a flash memory, a hard disk or any other similar devices or a combination thereof. The storage unit 14 is configured to record a plurality of modules executed by the processing unit 16, and these modules can be loaded to the processing unit 16 to execute the TV channel switching function.

The processing unit 16 is, for example, a central processing unit (CPU), or a programmable general-purpose or special-purpose microprocessor, a digital signal processor (DSP), a programmable controller, an application specific integrated circuit (ASIC), a programmable logic device (PLD) or other similar devices or a combination thereof. The processing unit 16 is coupled to the touch screen 12 and the storage unit 14, and is capable of accessing the modules stored in the storage unit 14 to execute the TV channel switching function.

The aforementioned modules include a display module 142, a detecting module 144 and a switching module 146, and these modules are, for example, computer programs, which can be loaded to the processing unit 16 to execute the TV channel switching function. Namely, the display module 142, the detecting module 144 and the switching module 146 can be, for example, integrated into an application (APP) which can be executed by the electronic apparatus 10 to directly establish a wireless connection with the TV, or establish a wireless connection with a TV box connected to the TV such as a set-top box (STB) or a home gateway, or establish a wireless connection with an intermediate device connected to the TV such as a dongle. A TV, a combination of a TV and a TV box, and a combination of a TV and a dongle are all referred to as a TV system, though the invention is not limited thereto. Moreover, the wireless connection can be established by using a wireless communication technique such as infrared, Bluetooth, radio frequency identification (RFID), wireless fidelity (Wi-Fi), or Wi-Fi direct. After the electronic apparatus 10 establishes the wireless connection with the TV system, the electronic apparatus 10 can switch the TV channels of the TV system. Detailed steps of switching the TV channels executed by the electronic apparatus 10 are described below.

Figure 2:
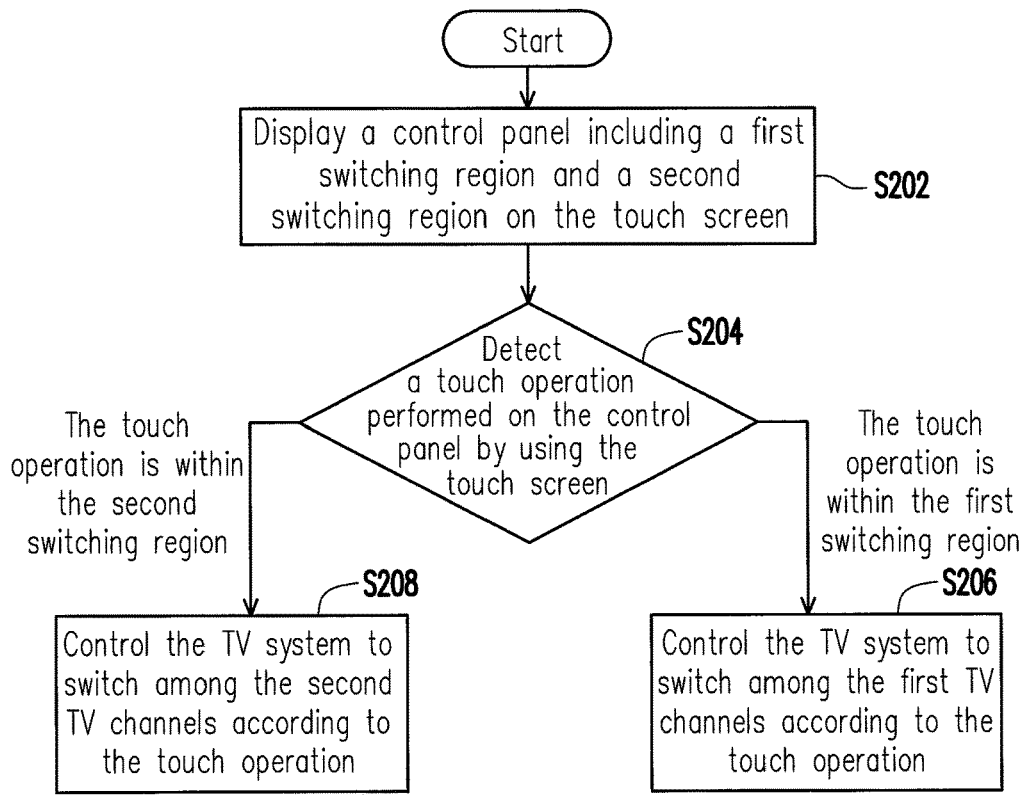
FIG. 2 is a flowchart illustrating a method for switching TV channels according to an embodiment of the invention.

FIG. 2 is a flowchart illustrating a method for switching TV channels according to an embodiment of the invention. Referring to FIG. 2, the method of the present embodiment is adapted to the electronic apparatus 10 of FIG. 1, and detailed steps of the method for switching the TV channels are described below with reference of the components in the electronic apparatus 10.

First, after the electronic apparatus 10 establishes the wireless connection with the TV system, the display module 142 displays a control panel including a first switching region and a second switching region on the touch screen 12 (step S202). Here, the first switching region corresponds to a plurality of first TV channels provided by the TV system, and the first TV channels can be TV channels provided by a cable TV provider or a satellite TV provider. The second switching region corresponds to a channel list, where the channel list is composed of a plurality of second TV channels selected from the first TV channels by a management module (not shown) of the electronic apparatus 10. To be specific, the second TV channels in the channel list can be selected according to the user's viewing history of the first TV channels or the user's presets. In another embodiment, after the electronic apparatus 10 establishes the wireless connection with the TV system, the TV system may record the user's viewing history or the user's presets of a different electronic apparatus 10 according to the unique device identifier (UDID) of the electronic apparatus 10 or other information used for identifying the electronic apparatus 10, so that the TV system may provide an exclusive channel list for a different user to switch the TV channels.

Then, the detecting module 144 detects a touch operation performed on the control panel by the user by using the touch screen 12 (step S204), so as to switch the first TV channels or the second TV channels. To be specific, in an embodiment, the display module 142 displays ranges of the first switching region and the second switching region on the control panel, or only divides the same without displaying, so as to facilitate the user performing operations therein. The detecting module 144 detects the touch operation of the user performed in the first switching region and the second switching region. The switching module 146 analyzes a gesture of the touch operation and controls the TV system to switch the TV channel accordingly. In another embodiment, the display module 142 displays a first key and a second key in the first switching region, and displays a third key and a fourth key in the second switching region. The detecting module 144 detects the touch operation of the user on these keys, so as to control the TV system to switch the TV channels accordingly. In this way, the user can control the TV system to switch the first or the second TV channels forward or backward by touching the keys.

Figure 3:
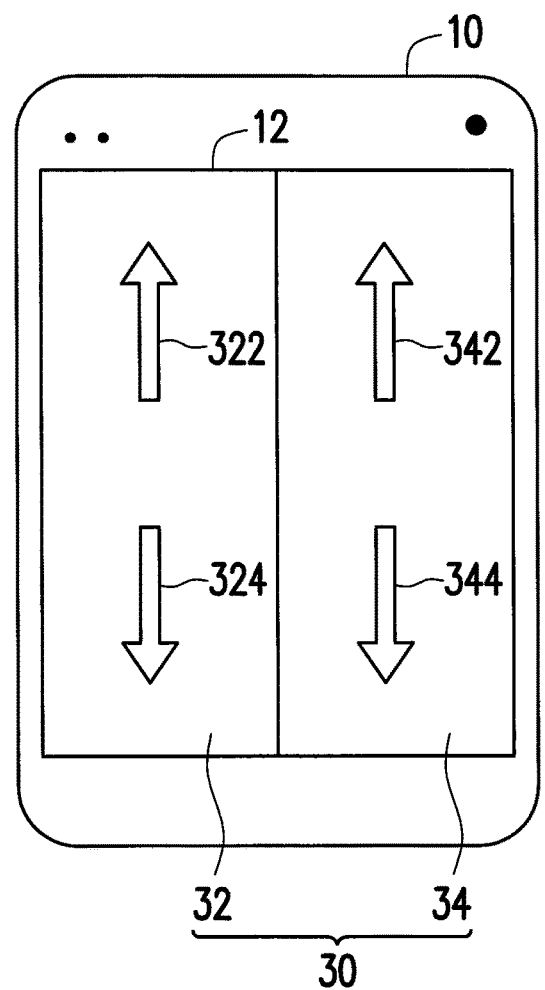
FIG. 3 is a schematic diagram of a touch screen of an electronic apparatus according to an embodiment of the invention.

For example, FIG. 3 is a schematic diagram of a frame displayed by the touch screen 12 of the electronic apparatus 10. Referring to FIG. 3, after the electronic apparatus 10 establishes the wireless connection with the TV system, the display module 142 of the electronic apparatus 10 displays the touch panel 30 including the first switching region 32 and the second switching region 34 on the touch screen 12. The first switching region 32 includes an upper key 322 and a lower key 324, and the second switching key 34 also includes an upper key 342 and a lower key 344. Therefore, the user is able to control the TV system to switch the first or the second TV channels forward or backward by touching the keys.

When the detecting module 144 detects that the touch operation of the user is within the first switching region 32, the switching module 146 controls the TV system to switch among the first TV channels according to the touch operation (step S206). To be specific, in an embodiment, when the detecting module 144 detects that the user performs the touch operation in the first switching region, the switching module 146 analyzes a gesture of the touch operation, so as to control the TV system to switch the first TV channels. In another embodiment, the detecting module 144 detects the touch operation of the user on the first key or the second key in the first switching region, so as to control the TV system to switch the first TV channels forward or backward.

Taking the control panel of FIG. 3 as an example, when the detecting module 144 detects that the user performs the touch operation on the upper key 322, the switching module 146 controls the TV system to switch to a previous first TV channel from the currently watched TV channel. When the detecting module 144 detects that the user performs the touch operation on the lower key 324, the switching module 146 controls the TV system to switch to a next first TV channel from the currently watched TV channel.

On the other hand, when the detecting module 144 detects that the touch operation of the user is within the second switching region 34, the switching module 146 controls the TV system to switch among the second TV channels according to the touch operation (step S208). To be specific, in an embodiment, when the detecting module 144 detects that the user performs the touch operation in the second switching region, the switching module 146 analyzes a gesture of the touch operation, so as to control the TV system to switch the second TV channels. In another embodiment, the detecting module 144 detects the touch operation of the user on the third key or the fourth key in the second switching region, so as to control the TV system to switch the second TV channels forward or backward.

Taking the control panel of FIG. 3 as an example, when the detecting module 144 detects that the user performs the touch operation on the upper key 342, the switching module 146 controls the TV system to switch to a previous second TV channel from the currently watched TV channel. When the detecting module 144 detects that the user performs the touch operation on the lower key 344, the switching module 146 controls the TV system to switch to a next second TV channel from the currently watched TV channel.

In another embodiment, the switching module 146 can control the TV system to switch to a previous or a next first/second TV channel from the currently watched TV channel according to a sliding direction of the touch operation detected by the detecting module 144.

For example, when the detecting module 144 detects that the user performs the touch operation in the first switching region and determines that the touch operation slides upwards, the switching module 146 switches the first TV channel currently displayed by the electronic apparatus 10 to the previous first TV channel. When the detecting module 144 detects that the user performs the touch operation in the first switching region and determines that the touch operation slides downwards, the switching module 146 switches the first TV channel currently displayed by the electronic apparatus 10 to the next first TV channel. Similarly, when the detecting module 144 detects that the user performs the touch operation in the second switching region and determines that the touch operation slides upwards, the switching module 146 switches the second TV channel currently displayed by the electronic apparatus 10 to the previous second TV channel. When the detecting module 144 detects that the user performs the touch operation in the second switching region and determines that the touch operation slides downwards, the switching module 146 switches the second TV channel currently displayed by the electronic apparatus 10 to the next second TV channel.

It should be noticed that when the detecting module 144 determines the sliding direction, the detecting module 144 further calculates an included angle between the sliding direction and an axial line (an X-axis or a Y-axis), and compares the includes angle with a predetermined angle threshold (e.g. 27°), so as to determine whether the touch operation of the user is valid. In brief, when the included angle between the sliding direction and the X-axis or the Y-axis is smaller than the predetermined angle threshold, the detecting module 144 determines that the touch operation is valid; otherwise, the detecting module 144 determines that the touch operation is invalid.

Figure 4:
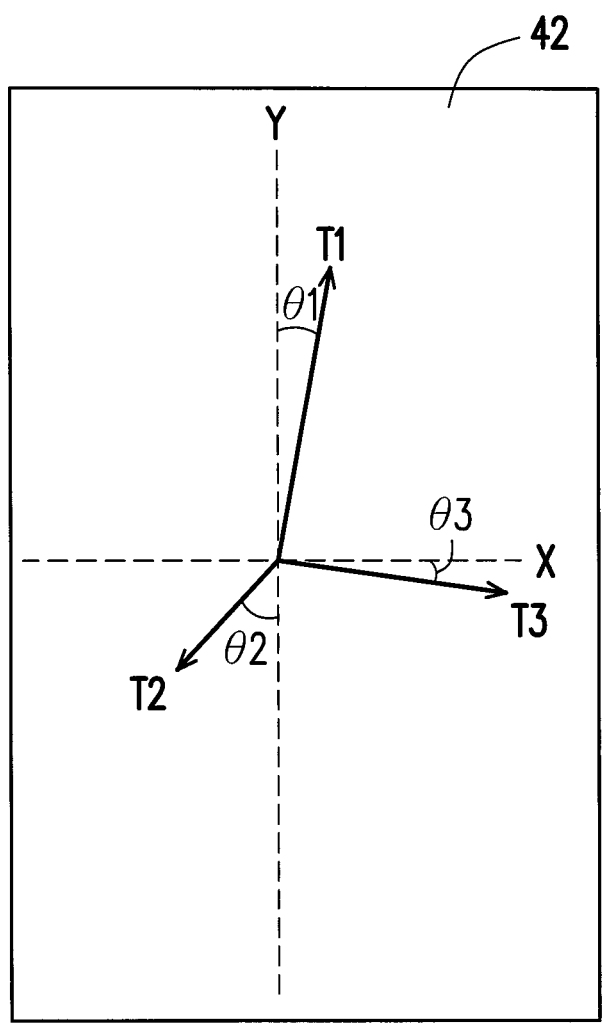
FIG. 4 is an example of detecting a touch operation of a user in a first switching region according to an embodiment of the invention.

To be specific, FIG. 4 is an example of detecting a touch operation of the user in the first switching region according to an embodiment of the invention.

Referring to FIG. 4, it is assumed that a first touch $T_1$ slides upwards in the first switching region 42, and an included angle $\theta_1$ between the sliding direction of the first touch $T_1$ and the Y-axis is 20°. The detecting module 144 detects that the user executes the first touch $T_1$ in the first switching region 42, and determines that the first touch $T_1$ slides upwards and the included angle between the sliding direction and the Y-axis is less than 27°. The detecting module 144 may determine that the user wishes to switch the current first TV channel to the pervious first TV channel, and the switching module 146 may therefore switch the TV channel to the previous first TV channel.

In another example, it is assumed that a second touch $T_2$ slides downwards in the first switching region 42, and an included angle $\theta_2$ between the sliding direction of second touch $T_2$ and the Y-axis is 40°. The detecting module 144 detects that the user executes the second touch $T_2$ in the first switching region 42, and determines that the second touch $T_2$ slides downwards and the included angle between the sliding direction and the X-axis as well as the included angle between the sliding direction and the Y-axis are both greater than 27°. The detecting module 144 may determine that the second touch $T_2$ is invalid, and the switching module 146 may not perform any operation to the TV system or the electronic apparatus 10.

In another example, it is assumed that a third touch $T_3$ slides rightwards in the first switching region 42, and an included angle $\theta_3$ between the sliding direction of the third touch $T_3$ and the X-axis is 15°. The detecting module 144 detects that the user executes the third touch $T_3$ in the first switching region 42, and determines that the third touch $T_2$ slides rightwards and the included angles between the sliding direction and the X-axis is less than 27°. The detecting module 144 may determine that the user wishes to perform other operations such as switching to other applications or pages, and the switching module 146 may switch the display frame to other applications or pages without switching the first TV channels.

Moreover, the example of the touch operation is not limited to be within the first switching region, the touch operation in the second switching region can also be determined in a similar fashion. Moreover, the sliding direction of the touch operation and the setting of the predetermined angle threshold are not limited to the above defined range. In other examples, they may also be set according to user habits.

Besides displaying the aforementioned keys or switching the TV channels through gestures, in another embodiment, the display module 142 can also directly display the content of the channel list in the second switching region 34, so as to facilitate the user receiving related content or information of each of the channels. For example, FIG. 5 is a schematic diagram of a frame displayed on the touch screen 12 of the electronic apparatus 10 according to an embodiment of the invention, and FIG. 6 is a flowchart illustrating a method for selecting the second TV channels according to another embodiment of the invention.

Figure 5:
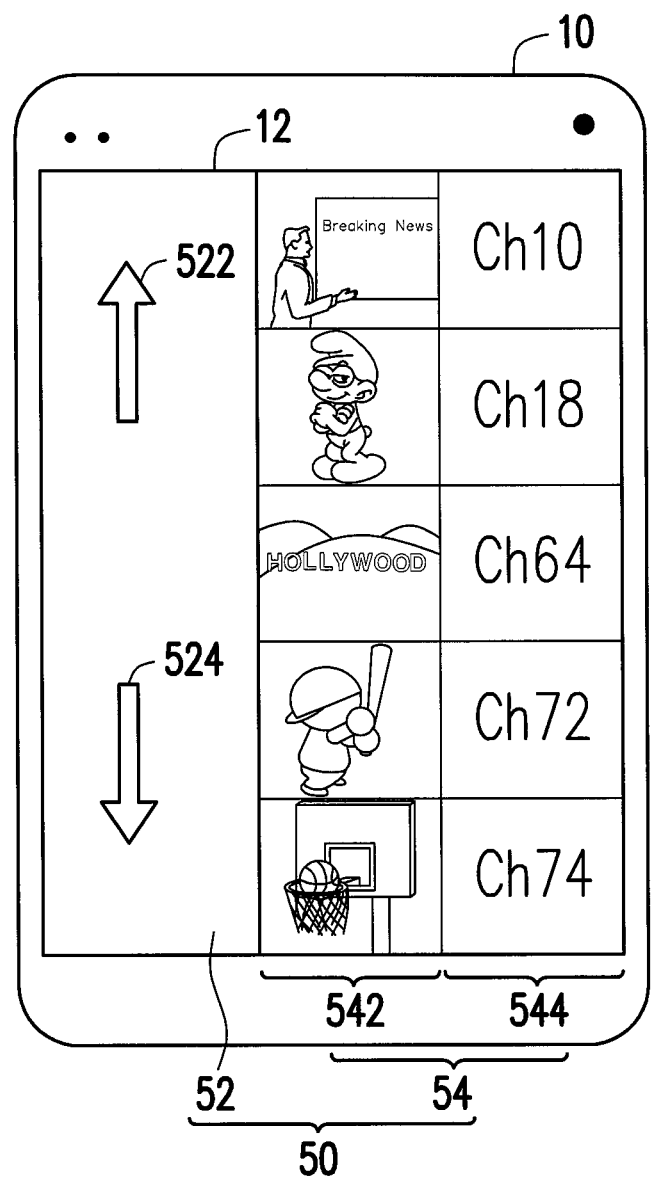
FIG. 5 is a schematic diagram of a frame displayed on a touch screen of an electronic apparatus according to an embodiment of the invention.
Figure 6:
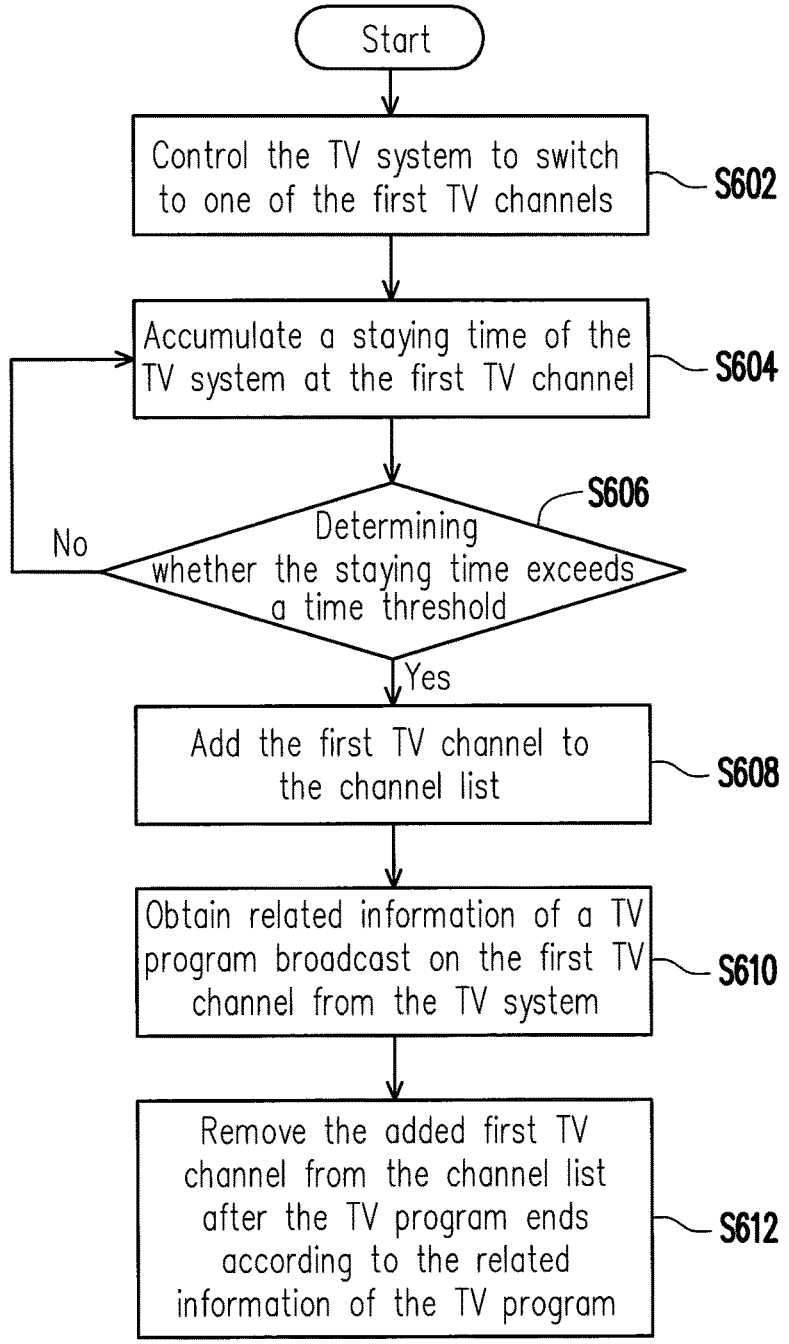
FIG. 6 is a flowchart illustrating a method for selecting second TV channels according to another embodiment of the invention.

Referring to FIG. 5, after the electronic apparatus 10 establishes the wireless connection with the TV system, the display module 142 of the electronic apparatus 10 displays a control panel 50 including a first switching region 52 and a second switching region 54 on the touch screen 12. Similar to the embodiment of FIG. 3, the first switching region 52 corresponds to a plurality of first TV channels provided by the TV system, and the first switching region 52 includes an upper key 522 and a lower key 524, which facilitates the user switching the first TV channels forward and backward. The related descriptions may refer to the embodiment of FIG. 3, which are not repeated herein.

Different from the embodiment of FIG. 3, in the present embodiment, the display module 142 may further display a channel list in the second switching region 54 of the control panel 30. The channel list may not only display options corresponding to the second TV channels but may also display related information of the second TV channels in the options. To be specific, the storage unit 14 further includes an information module (not shown) which can be used for obtaining one or a combination of a name, an icon, program information and a program snapshot of the corresponding TV channel, and the display module 142 may display the channel list accordingly.

For example, the channel list displayed by the display module 142 in the second switching region 54 includes five second TV channels Ch10, Ch18, Ch64, Ch72 and Ch74 selected from the first TV channels, and the display module 142 may display program snapshots 542 and names 544 of the above five second TV channels. When the detecting module 144 detects a position of the touch operation of the user, the switching module 146 controls the TV system to switch to the second TV channel corresponding to the aforementioned position. For example, when the user wishes to watch the second TV channel Ch72, the user may perform a touch operation on the program snapshot 542 or the name 544 of the second TV channel Ch72. The detecting module 144 may detect that the user performs the touch operation on the program snapshot 542 or the name 544 of the second TV channel Ch72, and the switching module 146 may control the TV system to switch to the second TV channel Ch72.

In an embodiment, when the number of the second TV channels on the channel list is greater than the number of the TV channels that can be displayed within a single page of the second switching region, the display module 142 may divide the channel list into a plurality of pages for displaying on the second switching region. The user can first switch the channel list to a previous page or a next page by using a sliding gesture, and then select the second TV channel to be watched by using a clicking gesture. To be specific, when the detecting module 144 detects that the user performs the touch operation on the channel list and determines that the touch operation slides rightwards, the switching module 146 may switch the currently displayed channel list to a next page. When the detecting module 144 detects that the user performs the touch operation on the channel list and determines that the touch operation slides leftwards, the switching module 146 may switch the currently displayed channel list to a previous page. When the detecting module 144 detects that the user performs the touch operation on the program snapshot or the name of the second TV channel, and determines the touch operation as a click operation, the switching module 146 may control the TV system to switch to the corresponding second TV channel.

Moreover, in another embodiment, when the number of the second TV channels on the channel list is greater than the number of the TV channels that can be displayed within a single page of the second switching region, the display module 142 can display the channel list as a scrollable channel list. Since each time the display module 142 can only display a part of the second TV channels in the second switching region, the user can first scroll the page of the channel list upwards or downwards by using the sliding gesture to check out all of the second TV channels in the channel list, and then select the second TV channel to be watched by using the clicking gesture. To be specific, when the detecting module 144 detects that the user performs the touch operation on the channel list and determines that the touch operation slides downwards, the switching module 146 scrolls the channel list upwards, so that the display apparatus 10 may display the second TV channels that are sorted at the bottom of the channel list. When the detecting module 144 detects that the user performs the touch operation on the channel list and determines that the touch operation slides upwards, the switching module 146 scrolls the channel list downwards, such that the electronic apparatus 10 displays the second TV channels that are sorted on the top of the channel list. Similarly, when the detecting module 144 detects that the user performs the touch operation on the program snapshot or the name of the second TV channel, and determines that the touch operation is a click operation, the switching module 146 may control the TV system to switch to the corresponding second TV channel. The mechanism which the detecting module 144 determines the touch operation may refer to the related description in the embodiment of FIG. 4, which will not be repeated hereinafter.

Figure 7:
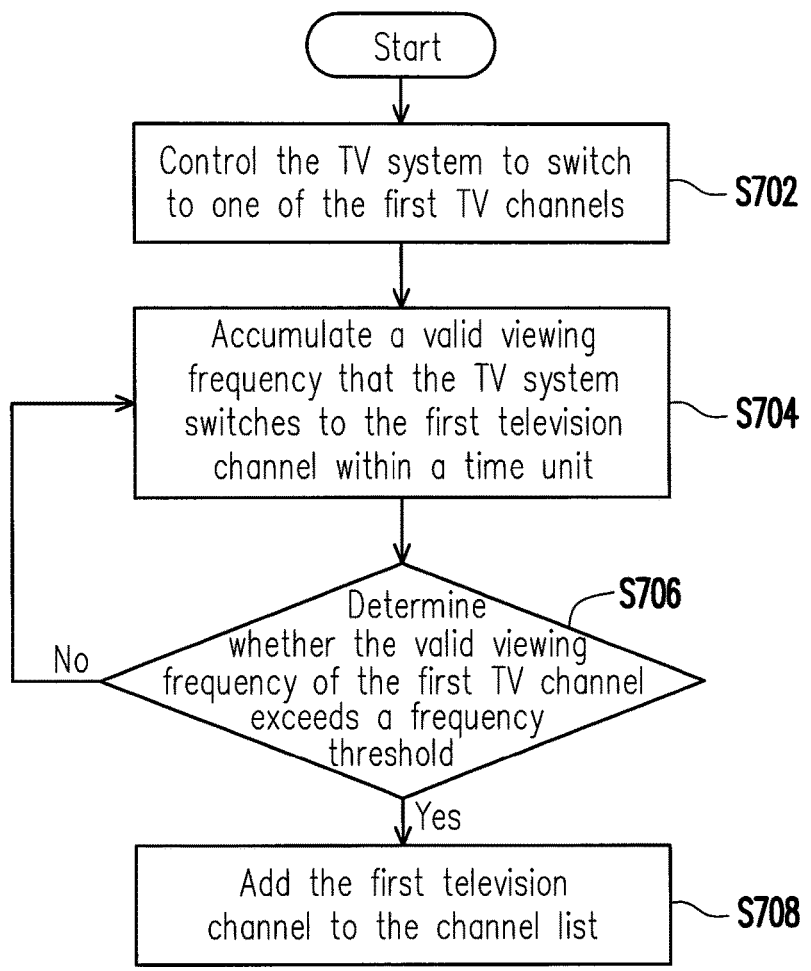
FIG. 7 is a flowchart illustrating a method for selecting second TV channels according to another embodiment of the invention.

Moreover, the electronic apparatus 10 can also select the second TV channels according to a viewing history of the first TV channels of a specific user of the electronic apparatus 10, and add the selected TV channels to the channel list. To be specific, after the electronic apparatus 10 establishes the wireless connection with the TV system, the management module of the electronic apparatus 10 accumulates a staying time or a valid viewing frequency of the TV system at each of the TV channels for selecting the second TV channels, and adds the selected TV channels to the channel list, so that the user can use the channel list to rapidly switch to the desired TV channels. FIG. 6 and FIG. 7 describe methods for selecting the second TV channels with more detail.

FIG. 6 is a flowchart illustrating a method for selecting the second TV channels according to an embodiment of the invention. In the present embodiment, the management module can select the second channels according to a staying time of the TV system at each first TV channel.

Referring to FIG. 6, after the switching module 146 controls the TV system to switch to one of the first TV channels (step S602), the management module accumulates a staying time of the TV system at such first TV channel (step S604). In other words, whenever the user switches to a certain first TV channel, the management module starts accumulating a staying time of the TV system at such first TV channel, i.e. the staying time after the user's switching operation.

Then, the management module determines whether the staying time exceeds a time threshold (step S606). When the staying time of the first TV channel exceeds the time threshold, the management module adds the first TV channel to the channel list (step S608). Otherwise, the method flow returns to step S604 to continually accumulate the staying time of the TV system at the first TV channel. Namely, the management module only adds the first TV channel with the staying time greater than the aforementioned time threshold after each switching operation to the channel list. The first TV channels with the staying time not greater than the time threshold are regarded as the TV channels being viewed by the user during the browsing, which are not the TV channels of interest.

After the management module adds the first TV channel to the channel list, the information module further obtains related information of a TV program currently being broadcast on the first TV channel from the TV system (step S610). The related information is, for example, a broadcast time of the TV program broadcast on the first TV channel. The management module can remove the added first TV channel from the channel list according to the related information (an ending time) of the TV program after the TV program ends (step S612). To be specific, a reason that the user stays at a certain TV channel is usually because the user is interested in the TV program being broadcast on the TV channel at the moment, and yet it does not mean that the user is interested in a next TV program to be broadcast on the same TV channel. Therefore, the TV program can be removed after the TV program ends, so as to meet an actual requirement of the user.

According to the aforementioned method, the TV programs of interest can be predicted during the browsing process so that the corresponding TV channels can be added to the channel list for the user, and the TV channel can be removed after the TV program ends, so as to maintain the TV channels on the channel list to the most interested TV channels at the moment.

FIG. 7 is a flowchart illustrating a method for selecting the second TV channels according to another embodiment of the invention. In the present embodiment, the management module may not only select the second TV channels according to the staying time of the TV system at each of the first TV channels, but may also select the second TV channels according to a valid viewing frequency of the first TV channel within a time unit.

Referring to FIG. 7, after the switching module 146 controls the TV system to switch to one of the first TV channels (step S702), the management module accumulates a valid viewing frequency that the TV system switches to the first television channel within the time unit (step S704). The valid viewing frequency is determined according to the frequency that that staying time at the first TV channel exceeds the time threshold. For example, it is assumed that the time unit is set to 3 hours, and the time threshold is set to 3 minutes. The management module accumulates the frequency that the TV system stays at the first TV channel for more than 3 minutes within the latest 3 hours, and takes the frequency as the valid viewing frequency of the first TV channel.

Then, the management module determines whether the valid viewing frequency of the first TV channel within the time unit exceeds a frequency threshold (step S706). When the valid viewing frequency of the first TV channel exceeds the frequency threshold, the management module adds the first television channel to the channel list (step S708). Otherwise, the method flow returns to the step S704 to continually accumulate the valid viewing frequency that the TV system switches to the first television channel within the time unit.

To be more specific, during the browsing process, the user may stay a longer time at the TV channel broadcasting the TV program of interest, and the frequency of switching to such TV channel within a short period of time is also increased. Therefore, in the present embodiment, the frequency that the user switches the TV system to the same TV channel within the time unit is accumulated. The accumulation is only regarded to be valid when the staying time exceeds the time threshold. The accumulation result is taken as the valid viewing frequency of the TV channel and served as a basis for determining whether to add the TV channel to the channel list. For example, assume that the frequency threshold is 5. The management module, for example, may add the first TV channel with the valid viewing frequency greater than 5 within the latest 3 hours to the channel list.

The second TV channels in the channel list can be added through the management module according to the viewing history of the user, the second TV channels can also be manually set by the user. In an embodiment, the information module of the electronic apparatus 10 first obtains an electronic program guide (EPG) or preview images of all of the first TV channels from the TV system. Taking the EPG as an example, the user may obtain information such as program names, channel numbers, broadcast time, program previews of the current TV program and the future TV programs according to the EPG. Moreover, according to the EPG, the user can search for TV programs according to program themes or channel themes, so as to quickly locate the TV programs to be watched. The user can add the favorite TV channels or TV programs of the EPG to a my-favorite list in the channels list through the electronic apparatus 10. When the electronic apparatus 10 is disconnected from the TV system, or when the valid viewing frequency is not greater than the frequency threshold, the corresponding second TV channel in the my-favorite list may not be removed by the management module. Moreover, the user can further remove the added second TV channel from the channel list according to the viewing history.

Besides that the display module 142 displays the channel list in the second switching region of the control panel 30, in an embodiment, the display module 142 can also display a single switching region on the control panel 30, i.e. merge the first switching region and the second switching region into one switching region to facilitate the user performing touch operations therein. The detecting module 144 detects the touch operation of the user in such switching region and analyzes a gesture of the touch operation, so as to control the TV system to switch the TV channels.

Figure 8A:
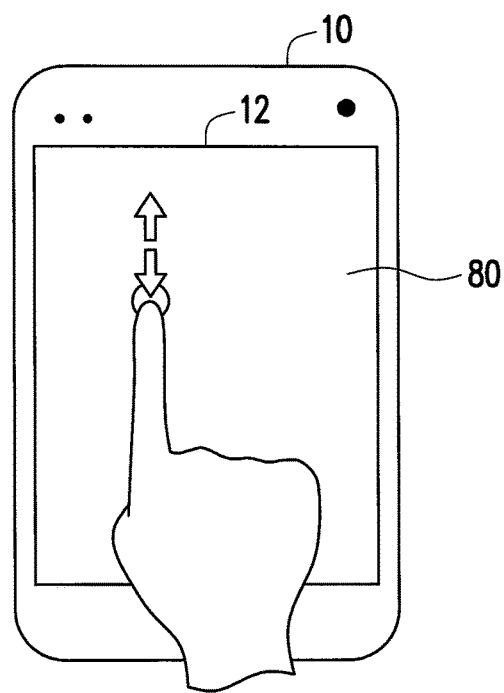
FIG. 8A and FIG. 8B are schematic diagrams of a touch screen of an electronic apparatus according to an embodiment of the invention.
Figure 8B:
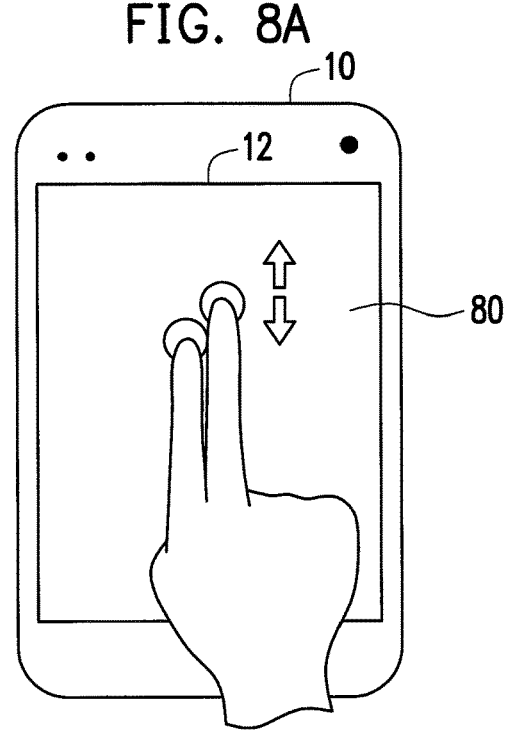

For example, FIG. 8A and FIG. 8B are schematic diagrams of the touch screen 12 of the electronic apparatus 10 according to an embodiment of the invention. Referring to FIG. 8A and FIG. 8B, the display module 142 can display the touch screen 12 on a control panel 80. When the detecting module 144 detects that the touch operation is a single-finger gesture operation (as shown in FIG. 8A), the switching module 146 controls the television system to switch the first television channels according to the single-finger gesture operation. For example, when a sliding direction of the single-finger gesture operation is upward, the switching module 146 controls the TV system to switch to a previous first TV channel from the current TV channel. When the sliding direction of the single-finger gesture operation is downward, the switching module 146 controls the TV system to switch to a next first TV channel from the current TV channel.

On the other hand, when the detecting module 144 detects that the touch operation is a two-finger gesture operation (as shown in FIG. 8B), the switching module 146 controls the television system to switch the second television channels according to the two-finger gesture operation. For example, when the detecting module 144 determines that a sliding direction of the two-finger gesture operation is upward, the switching module 146 controls the TV system to switch a previous second TV channel of the currently watched TV channel. When the detecting module 144 determines that the sliding direction of the two-finger gesture operation is downward, the switching module 146 controls the TV system to switch to a next second TV channel from the current TV channel.

In the embodiments of FIG. 8A and FIG. 8B, in terms of an angle of the sliding direction of the user's gesture, the mechanism of the embodiment of FIG. 4 can be used to determine whether the user wishes to switch the TV channels, and the selections of the second TV channels can also be implemented according to the methods in FIG. 6 and FIG. 7. The related descriptions may be referred to the embodiments of FIG. 4, FIG. 6 and FIG. 7, which may not be repeated hereinafter.

The invention further provides a computer program product, which can be used to execute the steps of the aforementioned method for switching TV channels. The computer program is composed of a plurality of program instructions (for example, an organization chart establishing program instruction, a table approving program instruction, a setting program instruction, and a deployment program instruction, etc). After these program instructions are loaded into the electronic apparatus and executed by the same, the steps for switching TV channels described above may be accomplished.

In summary, in the method, the apparatus and the computer program product for switching television channels of the invention, the touch screen is used to detect the touch operation of the user on the control panel, and the TV system is controlled to switch among the first TV channels or the second TV channels according to a click operation or a sliding operation of the touch operation in different switching regions of the control panel. Moreover, it is determined whether to add the TV channel to the channel list according to a staying time at the TV channel and the valid viewing frequency of the TV channel. Thereby, the user can freely select to switch the TV channels in the conventional way or rapidly switch to the desired TV channels through the same control panel, so as to enhance operating convenience of the mobile apparatus.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for switching television channels, adapted to a mobile apparatus having a touch screen for controlling a television system to switch television channels displayed thereby, the method comprising: displaying a control panel comprising a first switching region and a second switching region on the touch screen, wherein the first switching region corresponds to a plurality of first television channels provided by the television system, and the second switching region corresponds to a channel list, and the channel list comprises a plurality of second television channels selected from the first television channels, and the first switching region and the second switching region arc fixed; detecting a touch operation performed on the control panel by using the touch screen; controlling the television system to switch up and switch down between the first television channels according to the touch operation when the touch operation is within the first switching region; accumulating a staying time of the television system staying at one of the first television channels after the television system switches to the corresponding first television channel, determining whether the staying time of the television system staying at the first television channel exceeds a time threshold, and when the staying time of the television system at the first television channel exceeds the time threshold: accumulating a valid viewing frequency that the television system switches to the first television channel within a time unit given that the staying time at the first television channel exceeds the time threshold, and determining whether the valid viewing frequency exceeds a frequency threshold; and adding the first television channel to the channel list when the valid viewing frequency exceeds the frequency threshold; wherein after the step of adding the first television channel to the channel list, obtaining related information of a first television program broadcast on the first television channel at the moment when the first television channel is added to the channel list, wherein the related information comprises a broadcast time of the first television channel; and removing the added first television channel and the added first television program from the channel list when the first television program ends and controlling the television system to switch up and switch down between the second television channels according to the touch operation when the touch operation is within the second switching region.

2. The method as claimed in claim 1, wherein the first switching region comprises a first key and a second key, and wherein the step of controlling the television system to switch up and switch down between the first television channels according to the touch operation comprises:
controlling the television system to switch to a previous first television channel when the touch operation is performed on the first key; and
controlling the television system to switch to a next first television channel when the touch operation is performed on the second key.

3. The method as claimed in claim 1, wherein the second switching region comprises a third key and a fourth key, and wherein the step of controlling the television system to switch up and switch down between the second television channels according to the touch operation comprises:
controlling the television system to switch to a previous second television channel when the touch operation is performed on the third key; and
controlling the television system to switch to a next second television channel when the touch operation is performed on the fourth key.

4. The method as claimed in claim 1, wherein the step of controlling the television system to switch up and switch down between the first television channels according to the touch operation comprises:
controlling the television system to switch to a previous or a next first television channel according to a sliding direction of the touch operation.

5. The method as claimed in claim 1, wherein the step of controlling the television system to switch up and switch down between the second television channels according to the touch operation comprises:
controlling the television system to switch to a previous or a next second television channel according to a sliding direction of the touch operation.

6. The method as claimed in claim 1, wherein the step of displaying the control panel comprising the first switching region and the second switching region on the touch screen comprises:
displaying the channel list in the second switching region, wherein the channel list comprises a plurality of options corresponding to the second television channels, and each of the options comprises one or a combination of a name, an icon, program information and a program snapshot of the corresponding second television channel.

7. The method as claimed in claim 1, wherein the first switching region and the second switching region are the same, and wherein the step of controlling the television system to switch up and switch down between the first television channels and the second television channels according to the touch operation comprises:
when the touch operation is a single-finger gesture operation, controlling the television system to switch up and switch down between the first television channels according to the single-finger gesture operation; and
when the touch operation is a two-finger gesture operation, controlling the television system to switch up and switch down between the second television channels according to the two-finger gesture operation.

8. An apparatus for switching television channels, comprising: a touch screen; a storage unit, recording a plurality of modules; and one or a plurality of processing units, coupled to the touch screen and the storage unit, and accessing and executing the modules stored in the storage unit for causing the apparatus to: display a control panel comprising a first switching region and a second switching region on the touch screen, wherein the first switching region corresponds to a plurality of first television channels provided by the television system, and the second switching region corresponds to a channel list, and the channel list comprises a plurality of second television channels selected from the first television channels, and the first switching region and the second switching region are fixed; detect a touch operation performed on the control panel by using the touch screen; control the television system to switch up and switch down between the first television channels according to the touch operation when the apparatus detects that the touch operation is within the first switching region; accumulate a staying time of the television system staying at one of the first television channels after the television system switches to the corresponding first television channel; determine whether the staying time of the television system staying at the first television channel exceeds a time threshold, and when the staying time of the first television channel exceeds the time threshold: accumulate a valid viewing frequency that the television system switches to the first television channel within a time unit given that the staying time at the first television channel exceeds the time threshold, and determine whether the valid viewing frequency exceeds a frequency threshold; and add the first television channel to the channel list when the valid viewing frequency exceeds the frequency threshold; wherein the processing unit further executes the modules for causing the apparatus to obtain related information of a first television program broadcast on the first television channel at the moment when the first television channel is added to the channel list, wherein the related information comprises a broadcast time of the first television wherein the processing unit executes the modules for causing the apparatus to remove the added first television channel and the added first television program from the channel list when the broadcast time of the first television program ends; and control the television system to switch up and switch down between the second television channels according to the touch operation when the apparatus detects that the touch operation is within the second switching region.

9. The apparatus as claimed in claim 8, wherein the first switching region comprises a first key and a second key, wherein when the apparatus detects that the touch operation is performed on the first key, the processing unit executes the modules for causing the apparatus to control the television system to switch to a previous first television channel, and wherein when the apparatus detects that the touch operation is performed on the second key, the processing unit executes the modules for causing the apparatus to control the television system to switch to a next first television channel.

10. The apparatus as claimed in claim 8, wherein the second switching region comprises a third key and a fourth key, wherein when the apparatus detects that the touch operation is performed on the third key, the processing unit executes the modules for causing the apparatus to control the television system to switch to a previous second television channel, and wherein when the apparatus detects that the touch operation is performed on the fourth key, the processing unit executes the modules for causing the apparatus to control the television system to switch to a next second television channel.

11. The apparatus as claimed in claim 8, wherein the processing unit executes the modules for causing the apparatus to control the television system to switch to a previous or a next first television channel according to a sliding direction of the touch operation detected by the apparatus.

12. The apparatus as claimed in claim 8, wherein the processing unit executes the modules for causing the apparatus to control the television system to switch to a previous or a next second television channel according to a sliding direction of the touch operation detected by the apparatus.

13. The apparatus as claimed in claim 8, wherein the processing unit executes the modules for causing the apparatus to display the channel list in the second switching region, wherein the channel list comprises a plurality of options corresponding to the second television channels, and each of the options comprises one or a combination of a name, an icon, program information and a program snapshot of the corresponding second television channel.

14. The apparatus as claimed in claim 8, wherein the first switching region and the second switching region are the same, wherein when the apparatus detects that the touch operation is a single-finger gesture operation, the processing unit executes the modules for causing the apparatus to control the television system to switch up and switch down between the first television channels according to the single-finger gesture operation, and wherein when the apparatus detects that the touch operation is a two-finger gesture operation, the processing unit executes the modules for causing the apparatus to control the television system to switch up and switch down between the second television channels according to the two-finger gesture operation.

15. A computer program product loaded to an electronic apparatus to execute the following steps: displaying a control panel comprising a first switching region and a second switching region on a touch screen, wherein the first switching region corresponds to a plurality of first television channels provided by a television system, and the second switching region corresponds to a channel list, and the channel list comprises a plurality of second television channels selected from the first television channels, and the first switching region and the second switching region are fixed; detecting a touch operation performed on the control panel by using the touch screen; controlling the television system to switch up and switch down between the first television channels according to the touch operation when the touch operation is within the first switching region; accumulating a staying time of the television system staying at one of the first television channels after the television system switches to the corresponding first television channel, determining whether the staying time of the television system staying at the first television channel exceeds a time threshold, and when the staying time exceeds the time threshold: accumulating a valid viewing frequency that the television system switches to the first television channel within a time unit given that the staying time at the first television channel exceeds the time threshold, and determining whether the valid viewing frequency exceeds a frequency threshold; and adding the first television channel to the channel list when the valid viewing frequency exceeds the frequency threshold; wherein after the step of adding the first television channel to the channel list, obtaining related information of a first television program broadcast on the first television channel at the moment when the first television channel is added to the channel list, wherein the related information comprises a broadcast time of the first television channel; and removing the added first television channel and the added first television program from the channel list when the first television program ends.

\* \* \* \* \*